United States Patent
Shi et al.

(10) Patent No.: US 12,114,263 B2
(45) Date of Patent: Oct. 8, 2024

(54) METHOD AND DEVICE FOR DISCONTINUOUS RECEPTION

(71) Applicant: GUANGDONG OPPO MOBILE TELECOMMUNICATIONS CORP., LTD., Guangdong (CN)

(72) Inventors: Cong Shi, Dongguan (CN); Shukun Wang, Dongguan (CN); Weijie Xu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 356 days.

(21) Appl. No.: 17/503,193

(22) Filed: Oct. 15, 2021

(65) Prior Publication Data

US 2022/0039013 A1 Feb. 3, 2022

Related U.S. Application Data

(63) Continuation of application No. PCT/CN2019/084661, filed on Apr. 26, 2019.

(51) Int. Cl.
*H04W 52/02* (2009.01)
*H04L 1/1812* (2023.01)

(52) U.S. Cl.
CPC ....... *H04W 52/0232* (2013.01); *H04L 1/1819* (2013.01); *H04W 52/0216* (2013.01)

(58) Field of Classification Search
CPC ......... H04W 52/0232; H04W 52/0216; H04W 72/23; H04W 76/28; H04W 36/0085;
(Continued)

(56) References Cited

U.S. PATENT DOCUMENTS 9,578,675 B2 * 2/2017 Lee ................... H04W 72/23
10,485,052 B2 * 11/2019 Quan ................. H04W 76/28
(Continued)

FOREIGN PATENT DOCUMENTS

CN 102932882 A 2/2013
CN 105992266 A * 10/2016 ............ H04W 24/08
(Continued)

OTHER PUBLICATIONS

Xiaomi Communication:"Considerations on UE power saving for C-DRX", 3GPP Draft; R2-1903869 Considerations on UE Power Saving for C-DRX, 3rd Generation Partnership Project (3GPP), Mobile Competence Centre; Cedex; France, vol. RAN WG2, No. Xi'an, China; (Year: 2019).*

(Continued)

*Primary Examiner* — Ayaz R Sheikh
*Assistant Examiner* — Louis Samara
(74) *Attorney, Agent, or Firm* — Ladas & Parry, LLP

(57) ABSTRACT

A method and device for discontinuous reception are provided, and can further reduce a power consumption of a terminal device in a DRX process. The method includes: detecting, by a terminal device, a wakeup signal in a first time period; starting a drx-onDurationTimer in a DRX cycle after the first time period if the terminal device detects the wakeup signal; and/or, not starting the drx-onDurationTimer in the DRX cycle after the first time period if the terminal device does not detect the wakeup signal.

9 Claims, 5 Drawing Sheets

(58) Field of Classification Search
CPC .......... H04W 52/0235; H04W 52/0229; H04L 1/1819
See application file for complete search history.

(56) References Cited

U.S. PATENT DOCUMENTS

| | | | | |
|---|---|---|---|---|
| 2016/0044654 A1* | 2/2016 | Dalsgaard | ............ | H04W 76/28 370/329 |
| 2017/0094713 A1* | 3/2017 | Su | .................... | H04W 36/0085 |
| 2017/0118792 A1* | 4/2017 | Rico Alvarino | ...... | H04W 72/23 |
| 2018/0332655 A1* | 11/2018 | Ang | .................. | H04W 52/0216 |
| 2021/0306952 A1* | 9/2021 | Kuang | .................... | H04L 69/28 |

FOREIGN PATENT DOCUMENTS

| | | | | | |
|---|---|---|---|---|---|
| CN | 109219116 | A | | 1/2019 | |
| CN | 109429310 | A | | 3/2019 | |
| CN | 113993192 | A | * | 1/2022 | ............. H04L 5/001 |
| CN | 113038582 | B | * | 2/2023 | ........ H04W 52/0235 |
| KR | 101664279 | B1 | * | 10/2016 | ........ H04W 52/0229 |
| WO | WO-2009114802 | A1 | * | 9/2009 | ........... H04B 7/2612 |
| WO | 2020215332 | A1 | | 10/2020 | |

OTHER PUBLICATIONS

The EESR of corresponding European application No. 19926173.6, dated Mar. 4, 2022.
Xiaomi Communication:"Considerations on UE power saving for C-DRX", 3GPP Draft; R2-1903869 Considerations on UE Power Saving for C-DRX, 3rd Generation Partnership Project (3GPP), Mobile Competence Centre; 650, Route Des Lucioles; F-06921 Sophia-Antipolis Cedex; France, vol. RAN WG2, No. Xi'an, China; Apr. 8, 2019-Apr. 12, 2019 Apr. 6, 2019(Apr. 6, 2019), XP051701189, entire document.
International Search Report (ISR) dated Jan. 23, 2020 for Application No. PCT/CN2019/084661.
VIVO:"NR UE power saving" 3GPP TSG RAN WG1 Meeting #93 R1-1806091 May 25, 2018, entire document.
Intel Corporation:"Triggering UE adaptation to power consumption characteristics" 3GPP TSG RAN WG1 Meeting #95 R1-1812514 Nov. 16, 2018, entire document.
Written Opinion of the International Searching Authority in International Application No. PCT/CN2019/084661 mailed on Jan. 23, 2020, with English translation provided by Google Translate.

* cited by examiner

METHOD AND DEVICE FOR DISCONTINUOUS RECEPTION

CROSS-REFERENCE TO RELATED APPLICATIONS

This application is a continuation of International Application No. PCT/CN2019/084661, filed on Apr. 26, 2019, which is hereby incorporated by reference in its entirety.

TECHNICAL FIELD

Embodiments of the present application relate to the field of communications, and more specifically, to method and device for discontinuous reception (DRX).

BACKGROUND

In consideration of power saving of a terminal device, a DRX mechanism is introduced. A network device can configure a terminal device to be "waked up" at a time foreseen by the network device and to monitor a downlink control channel when the terminal device is waked up, and can also configure the terminal device to "sleep" at a time foreseen by the network device and not to monitor the downlink control channel when sleeping. In this way, if the network device has data to be transmitted to the terminal device, the terminal device can be scheduled within a wakeup time of the terminal device, and the terminal device can reduce power consumption during sleeping time.

Although a network configures the DRX mechanism for the terminal device, so that the terminal device is periodically waked up, so as to detect the downlink control channel. However, the terminal device is only scheduled depending on opportunities during a wakeup period, or the terminal device, when in the case of a very low traffic load, is even only scheduled in few DRX cycles. For a paging message that adopts the DRX mechanism, opportunities for the terminal device to receive the paging message are fewer. Therefore, after being configured with the DRX mechanism, the terminal device may not be able to detect a control channel but still be waked up during most of the wakeup periods, which increases unnecessary power consumption.

SUMMARY

The present application provides a method and device for discontinuous reception, which can further reduce power consumption of a terminal device during a DRX process.

According to a first aspect, a method for discontinuous reception is provided, including: detecting, by a terminal device, a wakeup signal in a first time period; starting a DRX On Duration timer in a DRX cycle after the first time period if the terminal device detects the wakeup signal; and/or not starting the DRX On Duration timer in the DRX cycle after the first time period if the terminal device does not detect the wakeup signal.

According to a second aspect, a method for discontinuous reception is provided, including: detecting, by a terminal device, a wakeup signal in a first time period; if the terminal device detects the wakeup signal and the wakeup signal is used to indicate that the terminal device starts a DRX On Duration timer in a DRX cycle after the first time period, or the terminal device does not detect the wakeup signal, starting the DRX On Duration timer in the DRX cycle after the first time period; and/or if the terminal device detects the wakeup signal and the wakeup signal is used to indicate that the terminal device does not start the DRX On Duration timer in the DRX cycle after the first time period, not starting the DRX On Duration timer in the DRX cycle after the first time period.

According to a third aspect, a method for discontinuous reception is provided, including: determining, by a network device, whether a terminal device needs to start a DRX On Duration timer in a DRX cycle after a first time period; sending a wakeup signal to the terminal device in the first time period if the network device determines that the terminal device needs to start the DRX On Duration timer; and/or not sending the wakeup signal to the terminal device in the first time period if the network device determines that the terminal device does not need to start the DRX On Duration timer.

According to a fourth aspect, a method for discontinuous reception is provided, including: sending, by a network device, a wakeup signal to a terminal device in a first time period, where the wakeup signal is used to indicate whether the terminal device starts a DRX On Duration timer in a DRX cycle after the first time period.

According to a fifth aspect, a terminal device is provided, where the terminal device can execute the method according to the above-described first aspect or any implementation thereof. Specifically, the terminal device can include functional modules for executing the method according to the above-described first aspect or any possible implementation thereof.

According to a sixth aspect, a terminal device is provided, where the terminal device can execute the method according to the above-described second aspect or any implementation thereof. Specifically, the terminal device can include functional modules for executing the method according to the above-described second aspect or any possible implementation thereof.

According to a seventh aspect, a network device is provided, where the network device can execute the method according to the above-described third aspect or any implementation thereof. Specifically, the network device can include functional modules for executing the method according to the above-described third aspect or any possible implementation thereof.

According to an eighth aspect, a network device is provided, where the network device can execute the method according to the above-described fourth aspect or any implementation thereof. Specifically, the network device can include functional modules for executing the method according to the above-described fourth aspect or any possible implementation thereof.

According to a ninth aspect, a terminal device is provided, including a processor and a memory. The memory is configured to store a computer program, and the processor is configured to call and run the computer program stored in the memory to execute the method according to the above-described first aspect or any possible implementation thereof.

According to a tenth aspect, a terminal device is provided, including a processor and a memory. The memory is configured to store a computer program, and the processor is configured to call and run the computer program stored in the memory to execute the method according to the above-described second aspect or any possible implementation thereof.

According to an eleventh aspect, a network device is provided, including a processor and a memory. The memory is configured to store a computer program, and the processor is configured to call and run the computer program stored in the memory to execute the method according to the above-described third aspect or any possible implementation thereof.

According to a twelfth aspect, a network device is provided, including a processor and a memory. The memory is configured to store a computer program, and the processor is configured to call and run the computer program stored in the memory to execute the method according to the above-described fourth aspect or any possible implementation thereof.

According to a thirteenth aspect, a chip is provided, including a processor. The processor is configured to call and run a computer program from a memory, so that a device equipped with the chip executes the method according to the above-described first aspect or any possible implementation thereof, or executes the method according to the above-described second aspect or any possible implementation thereof.

According to a fourteenth aspect, a chip is provided, including a processor. The processor is configured to call and run a computer program from a memory, so that a device equipped with the chip executes the method according to the above-described third aspect or any possible implementation thereof, or executes the method according to the above-described fourth aspect or any possible implementation thereof.

According to a fifteenth aspect, a computer-readable storage medium is provided. The computer-readable storage medium is configured to store a computer program, which causes a computer to execute the method according to the above-described first aspect or any possible implementation thereof, or to execute the method according to the above-described second aspect or any possible implementation thereof.

According to a sixteenth aspect, a computer-readable storage medium is provided. The computer-readable storage medium is configured to store a computer program, which causes a computer to execute the method according to the above-described third aspect or any possible implementation thereof, or to execute the method according to the above-described fourth aspect or any possible implementation thereof.

According to a seventeenth aspect, a computer program product is provided. The computer program product includes computer program instructions, which cause a computer to execute the method according to the above-described first aspect or any possible implementation thereof, or to execute the method according to the above-described second aspect or any possible implementation thereof.

According to an eighteenth aspect, a computer program product is provided. The computer program product includes computer program instructions, which cause a computer to execute the method according to the above-described third aspect or any possible implementation thereof, or to execute the method according to the above-described fourth aspect or any possible implementation thereof.

According to a nineteenth aspect, a computer program is provided, which, when run on a computer, causes the computer to execute the method according to the above-described first aspect or any possible implementation thereof, or to execute the method according to the above-described second aspect or any possible implementation thereof.

According to a twentieth aspect, a computer program is provided, which, when run on a computer, causes the computer to execute the method according to the above-described third aspect or any possible implementation thereof, or to execute the method according to the above-described fourth aspect or any possible implementation thereof.

According to a twenty-first aspect, a communication system is provided, including a terminal device and a network device.

The network device is configured to: determine whether the terminal device needs to start a DRX On Duration timer in a DRX cycle after a first time period; send a wakeup signal to the terminal device in the first time period if it is determined that the terminal device needs to start the DRX On Duration timer; and/or not send the wakeup signal to the terminal device in the first time period if it is determined that the terminal device does not need to start the DRX On Duration timer.

The terminal device is configured to: detect the wakeup signal in the first time period; start the DRX On Duration timer in the DRX cycle after the first time period if the wakeup signal is detected; and/or, not start the DRX On Duration timer in the DRX cycle after the first time period if the terminal device does not detect the wakeup signal.

According to a twenty-second aspect, a communication system is provided, including a terminal device and a network device.

The network device is configured to: send a wakeup signal to the terminal device in a first time period, where the wakeup signal is used to indicate whether the terminal device starts a DRX On Duration timer in a DRX cycle after the first time period.

The terminal device is configured to: detect the wakeup signal in the first time period; start the DRX On Duration timer in the DRX cycle after the first time period if the wakeup signal is detected and the wakeup signal is used to indicate that the terminal device starts the DRX On Duration timer in the DRX cycle after the first time period, or no wakeup signal is detected; and/or, not start the DRX On Duration timer in the DRX cycle after the first time period if the wakeup signal is detected and the wakeup signal is used to indicate that the terminal device does not start the DRX On Duration timer in the DRX cycle after the first time period.

Based on the above-described technical solutions, the network device indicates whether the terminal device needs to start the DRX On Duration timer at an appointed moment through whether sending the wakeup signal, and the terminal device determines whether it's necessary to start the DRX On Duration timer in the DRX cycle after the wakeup signal according to whether the wakeup signal sent by the network device is detected, so that it's not necessary to wake up and monitor a PDCCH in the case that there is no need to be waked up, thus further reducing the power consumption of the terminal device during the DRX process.

Alternatively, the network device indicates whether terminal device needs to start the DRX On Duration timer at an appointed moment through sending the wakeup signal, and the terminal device determines whether it's necessary to start the DRX On Duration timer in the DRX cycle after the wakeup signal according to the detected wakeup signal, so that it's not necessary to wake up and monitor a PDCCH in the case that there is no need to be waked up, thus further reducing the power consumption of the terminal device during a DRX process.

DESCRIPTION OF EMBODIMENTS

The technical solutions in embodiments of the present application will be described below in conjunction with the accompanying drawings.

The technical solutions of the embodiments of the present application can be applied to various communication systems, for example, a global system of mobile communication (GSM), a code division multiple access (CDMA) system, a wideband code division multiple access (WCDMA) system, a long term evolution (LTE) system, a LTE frequency division duplex (FDD) system, a LTE time division duplex (FDD) system, an advanced long term evolution (LTE-A) system, a new radio (NR) system, an evolution system of NR system, a LTE-based access to unlicensed spectrum (LTE-U) system, a NR-based access to unlicensed spectrum (NR-U) system, a universal mobile telecommunication system (UMTS), wireless local area networks (WLAN) system, wireless fidelity (WiFi) system, a future 5G system or other communication systems and the like.

Generally speaking, the number of connections supported by a traditional communication system is limited number and the connections are easy to implement. However, with the development of the communication technology, a mobile communication system will not only support traditional communication, but also support, for example device to device (D2D) communication, machine to machine (M2M) communication, machine type communication (MTC) and vehicle to vehicle (V2V) communication and the like. The embodiments of the present application can also be applied to these communication systems.

In an implementation, the communication system in the embodiments of the present application can also be applied to a carrier aggregation (CA) scenario, a dual connectivity (DC) scenario, a standalone (Standalone, SA) network deployment scenario and the like.

Figure 1:
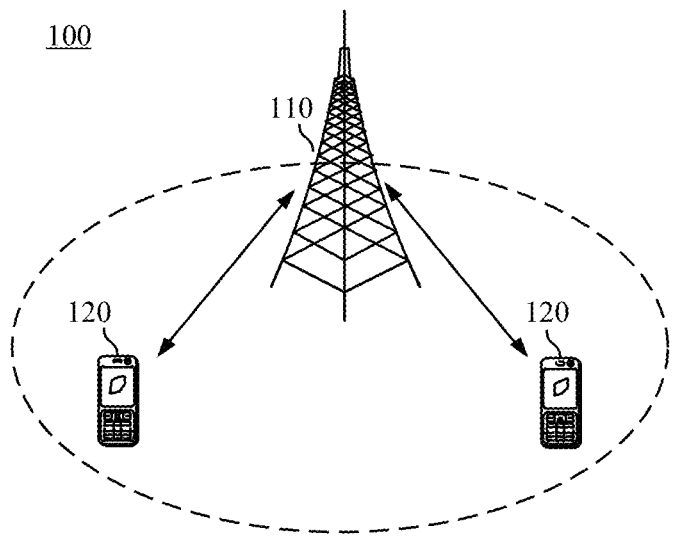
FIG. 1 is a schematic diagram of a possible wireless communication system to which an embodiment of the present application is applied.

FIG. 1 is a schematic diagram of a possible wireless communication system to which an embodiment of the present application is applied. The wireless communication system 100 may include a network device 110. The network device 110 can provide communication coverage for a specific geographic area, and can communicate with terminal devices located in this coverage area.

In an implementation, the network device 100 can be a base station (Base Transceiver Station, BTS) in a GSM system or a CDMA system, or can also be a base station (NodeB, NB) in a WCDMA system, or can also be an evolutional base station (Evolutional Node B, eNB or eNodeB) in an LTE system, or a wireless controller in the cloud radio access network (CRAN), or the network device can be a relay station, an access point, a vehicle-mounted device, a wearable device, a future network side device or a network device in the future evolutional public land mobile network (PLMN) and the like.

The wireless communication system 100 also includes at least one terminal device 120 located within the coverage area of the network device 110.

The terminal device 120 can be mobile or fixed.

In an implementation, the terminal device 120 can refer to a user device, an access terminal, a user unit, a user station, a mobile station, a remote station, a remote terminal, a mobile device, a user terminal, a terminal, a wireless communication device, a user agent, or a user apparatus. The terminal device can also be a cellular phone, a cordless phone, a session initiation protocol (SIP) phone, a wireless local loop (WLL) station, a personal digital assistant (PDA), and a handheld device having the function of wireless communication, a computing device or other processing devices connected to wireless modems, a vehicle-mounted device, a wearable device, a terminal devices in the future 5G network or a terminal device in the future evolutional public land mobile network (PLMN) and the like, for which the embodiments of the present application do not restrict. In an implementation, terminal direct connection (Device to Device, D2D) communication can also be performed between the terminal devices 120.

The network device 110 can provide services for a cell, and the terminal device 120 communicates with the network device 110 through transmission resources used by the cell, such as frequency domain resources, or spectrum resources. The cell can be a cell corresponding to the network device 110. The cell can belong to a macro base station or a base station corresponding to a small cell. The small cell here can include: a metro cell, a micro cell, a pico cell, a femto cell and the like. These small cells have the characteristics of small coverage and low transmit power, and are applied to provide high-rate data transmission services.

FIG. 1 exemplarily shows one network device and two terminal devices, but the present application is not limited thereto. The wireless communication system 100 can include a plurality of network devices, and other number of terminal devices can be included in the coverage area of each network device. In addition, the wireless communication system 100 can also include other network entities such as a network controller and a mobility management entity.

The DRX mechanism can make the terminal device enter a sleeping state periodically at certain time and not monitor a physical downlink control channel (PDCCH), and be waked up from the sleeping state when it is necessary to monitor the PDCCH, so as to make the terminal device achieves the purpose of saving power.

Figure 2:
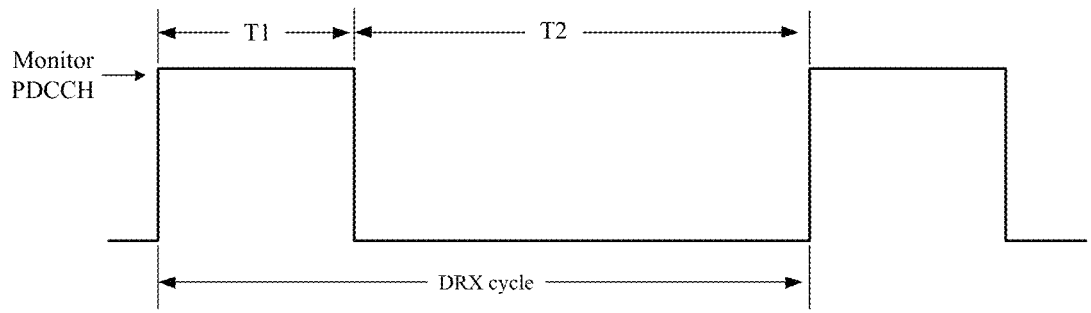
FIG. 2 is a schematic diagram of a DRX cycle.

FIG. 2 is a schematic diagram of a typical DRX cycle. As shown in FIG. 2, time period T1 is a wakeup time of the terminal device, which is called On Duration, and time period T2 is a sleeping time of the terminal device, which is called Opportunity for DRX. The network device can configure a DRX On Duration timer (drx-onDurationTimer) for the terminal device to control the wakeup time of the terminal device. A timing duration of the drx-onDuration-Timer is T1. The terminal device needs to continuously monitor a PDCCH during the wakeup time T1, but does not monitor the PDCCH during the sleeping time T2. The longer the time of T2 is, the lower the power consumed by the terminal device is, but correspondingly, the delay of service transmission will increase accordingly. Therefore, in addition to the drx-onDurationTimer, the network device also configures other DRX timers for the terminal device to adjust the wakeup time of the terminal device jointly.

For example, a DRX inactivity timer (drx-Inactivity-Timer) indicates how long the terminal device needs to continue monitoring after successfully detecting the PDCCH.

For another example, a DRX downlink retransmission timer (drx-RetransmissionTimerDL) is used for the terminal device to receive a downlink retransmission service, and indicates a length of duration, for which the terminal device needs to continuously monitor in order to receive a desired downlink retransmission service. Correspondingly, a DRX uplink retransmission timer (drx-RetransmissionTimerUL) is used for an uplink retransmission service of the terminal device.

For another example, a DRX downlink hybrid automatic repeat request (HARD) round-trip time (RTT) timer (HARQ-RTT-TimerDL) is used for the terminal device to receive a downlink retransmission service, and indicates a length of duration, for which the terminal device needs to wait before receiving a desired downlink retransmission service. Correspondingly, a DRX uplink HARQ round-trip time timer (HARQ-RTT-TimerUL) is used for an uplink retransmission service of the terminal device.

In addition, the network device can also configure a random access contention resolution timer (ra-ContentionResolutionTimer), a DRX short cycle timer (drx-ShortCycleTimer), and other DRX timers for the terminal device.

Figure 3:
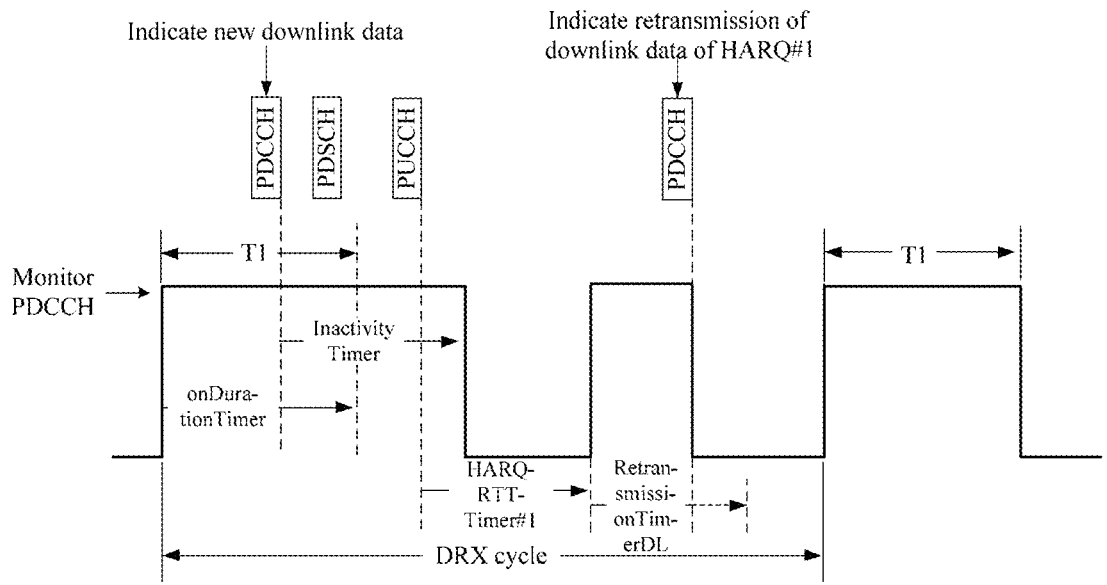
FIG. 3 is a schematic diagram of a DRX timer.

Taking FIG. 3 as an example, during a timing of a drx-onDurationTimer, a terminal device monitors a PDCCH. If the terminal device detects that the PDCCH indicates new downlink data during the timing of the drx-onDurationTimer, a drx-InactivityTimer is started. One transmission of new downlink data indicates a beginning of a HARQ process. The terminal device receives a physical downlink shared channel (PDSCH) according to downlink control information (downlink control information, DCI) in this PDCCH.

The terminal device carries HARQ feedback information to the network device in a physical uplink control channel (PUCCH) or a physical uplink shared channel (PUSCH). The terminal device starts a HARQ-RTT-TimerDL of a corresponding HARQ process at the first symbol after finishing sending all the symbols of PUCCH or PUSCH carrying HARQ feedback information.

When the HARQ-RTT-TimerDL has been expired, if a previously received PDSCH has a transport block (TB) that fails to be decoded, the terminal device will start a drx-RetransmissionTimerDL. During a timing of the drx-RetransmissionTimerDL, the terminal device is in active time and blindly detects the PDCCH. If retransmission DCI is detected, the drx-RetransmissionTimerDL is stopped, and the PDSCH is received based on the retransmission DCI. If all the previously received PDSCHs are successfully decoded, the terminal device does not start the drx-RetransmissionTimerDL.

Although the above-mentioned DRX mechanism makes the terminal device monitor a PDCCH only during partial time of each DRX cycle, the terminal device may only be scheduled in few DRX cycles, and cannot detect the PDCCH but still be waked up in most DRX cycles, which increases unnecessary power consumption.

For this reason, embodiments of the present application propose that a network device can send a wakeup signal (WUS) to a terminal device within a preset time duration before a start moment of a drx-onDurationTimer, and instructs the terminal device whether it's necessary to start a drx-onDurationTimer at the start moment through the wakeup signal. In this way, if the network device schedules data to the terminal device, the terminal device can be instructed to start the drx-onDurationTimer as usual at the start moment through the wakeup signal, so as to wake up the terminal device to monitor a PDCCH; if the network device does not schedule data to the terminal device, the terminal device can be instructed not to start the drx-onDurationTimer through the wakeup signal, so that it is not necessary to wake up the terminal device, thus further reducing the power consumption of the terminal device.

However, if there are other DRX timers running at this time, whether the terminal device needs to start the drx-onDurationTimer and how to deal with the other running DRX timers also become problems that needs to be solved.

For this reason, an embodiment of the present application provides a method for discontinuous reception, which can ensure effective operation of each DRX timer in a DRX process, thereby further reducing the power consumption of the terminal device.

Figure 4:
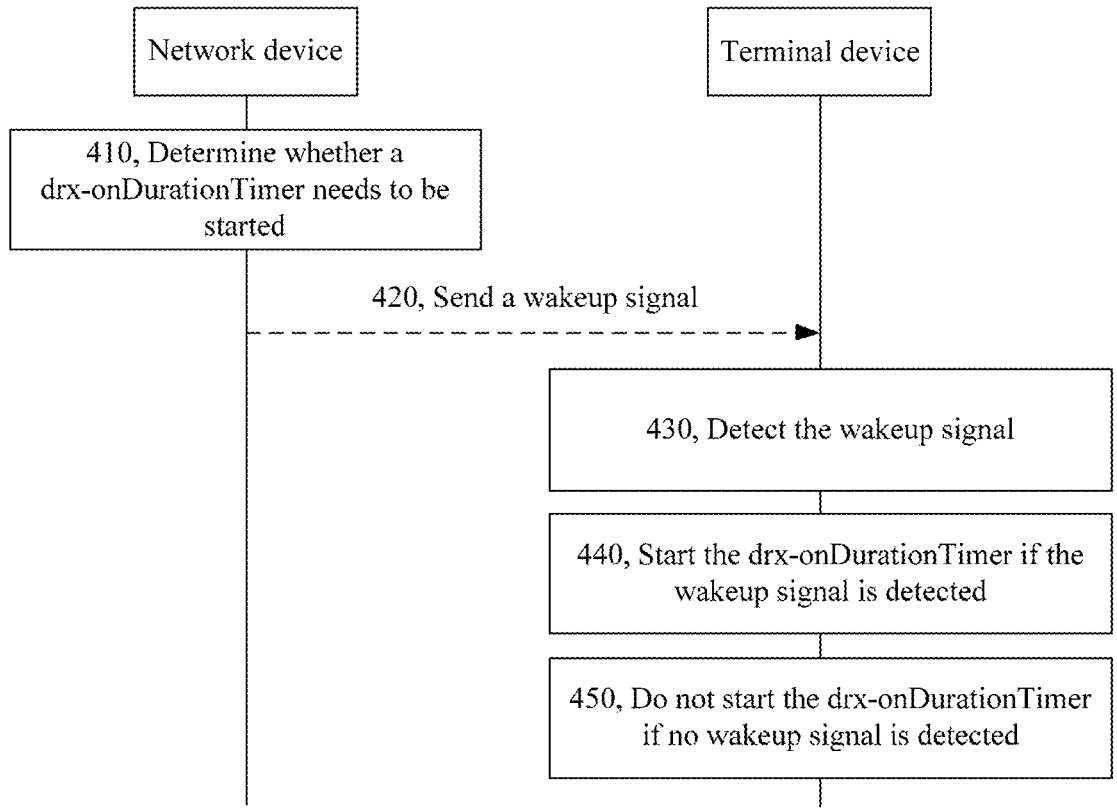
FIG. 4 is a schematic flowchart interaction diagram of a method for discontinuous reception according to an embodiment of the present application.

FIG. 4 is a schematic flow interaction diagram of a method for discontinuous reception according to an embodiment of the present application. The method shown in FIG. 4 can be executed by a terminal device and a network device, where the terminal device may be, for example, the terminal device 120 shown in FIG. 1 and the network device may be, for example, the network device 110 shown in FIG. 1. As shown in FIG. 4, the method for discontinuous reception includes:

In 410, the network device determines whether the terminal device needs to start a drx-onDurationTimer in a DRX cycle after a first time period.

If the network device determines that the terminal device needs to start the drx-onDurationTimer, 420 is executed; and/or if the network device determines that the terminal device does not need to start the drx-onDurationTimer, 420 is not executed.

In 420, the network device sends a wakeup signal WUS to the terminal device in the first time period.

In 430, the terminal device detects the wakeup signal in the first time period.

If the terminal device detects the wakeup signal, 440 is executed; if the terminal device does not detect the wakeup signal, 450 is executed.

In 440, the terminal device starts the drx-onDurationTimer in the DRX cycle after the first time period.

In 450, the terminal device does not start the drx-onDurationTimer in the DRX cycle after the first time period.

In this embodiment, the network device indicates whether the terminal device starts the drx-onDurationTimer at a appointed moment through whether sending the wakeup signal, and the terminal device determines whether it's necessary to start the drx-onDurationTimer in the DRX cycle after the wakeup signal according to whether the wakeup signal sent by the network device is detected, so that it's not necessary to wake up and monitor a PDCCH in the case that there is no need to be waked up, thus further reducing the power consumption of the terminal device during a DRX process.

The drx-onDurationTimer is used to control the On Duration in the DRX cycle. The start moment of the drx-onDurationTimer is the start moment of time period T1 in FIG. 2 and FIG. 3, and the end moment of the drx-onDurationTimer is the end moment of the time period T1 in FIG. 2 and FIG. 3.

Figure 5:
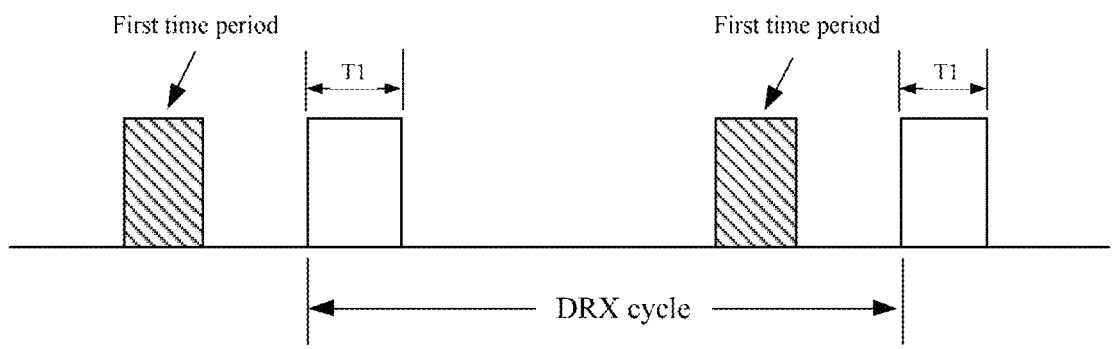
FIG. 5 is a schematic diagram of a first time period for sending a wakeup signal.

For example, as shown in FIG. 5, the first time period may be located before the time period T1, and is used to transmit the wakeup signal. Whether the wakeup signal is sent or not can be used to indicate whether the terminal device needs to be waked up in the time period T1, or in other words, to indicate whether it is necessary to start the drx-onDurationTimer at a beginning location of the time period T1.

If the terminal device detects the wakeup signal in the first time period, the drx-onDurationTimer will be started at the appointed moment, that is, the beginning moment of the time period T1, and wake up and monitor a PDCCH within the timing duration of the drx-onDurationTimer, that is, the time period T1; if the terminal device does not detect the wakeup signal in the first time period, it does not need to start the drx-onDurationTimer, and stays in a sleeping state during the time period T1.

The network device can send indication information to the terminal device, where the indication information is used to indicate the first time period, for example, is used to indicate information, such as a position and/or a length and the like of the first time period relative to the time period T1, so that the terminal device receives the indication information, so as to acquire the first time period, and detects the wakeup signal in the first time period. The indication information may be, for example, a radio resource control (RRC) signaling, a medium access control (MAC) signaling, or DCI, etc.

Alternatively, the first time period can also be agreed by a protocol.

If the network device has data to be sent that needs to be sent to the terminal device, a wakeup signal is sent to the terminal device, so as to instruct the terminal device to start the drx-onDurationTimer in a next DRX cycle, so that the terminal device is waked up and receives data; if the network device has no data to be sent, no wakeup signal is sent to the terminal device, so as to instruct the terminal device not to start the drx-onDurationTimer in the next DRX cycle, thus the terminal device can continue staying in a sleeping state, which saves the power consumption of the terminal device.

It should be understood that, in the embodiment of the present application, whether the wakeup signal is sent in the first time period can be used to indicate whether the terminal device starts the drx-onDurationTimer in one DRX cycle after the first time period, and can also be used to indicate whether the terminal device starts the drx-onDurationTimer in multiple consecutive DRX cycles after the first time period.

Since there may be other DRX timers except the drx-InactivityTimer running in the first time period, the terminal device needs to determine whether to stop these running DRX timers.

In an implementation, the method further includes: continue running or stopping a drx-InactivityTimer running in the first time period if the terminal device does not detect the wakeup signal and the drx-InactivityTimer has not stopped; and/or, continue running the drx-InactivityTimer running in the first time period if the terminal device detects the wakeup signal and the drx-InactivityTimer has not stopped.

In an implementation, the method further includes: the terminal device continues running other DRX timers running in the first time period if the other DRX timers have not stopped.

The other DRX timers mentioned here include, for example, at least one of the following DRX timers: a drx-RetransmissionTimerDL, a drx-RetransmissionTimerUL, a drx-ShortCycleTimer, a DRX HARQ-RTT-TimerDL, a DRX HARQ-RTT-TimerUL, a ra-ContentionResolutionTimer and the like.

This embodiment is further explained in combination with the following two situations.

Situation I

If the terminal device detects the wakeup signal in the first time period and DRX timers running in the first time period have not stopped, the terminal device needs to continue running these DRX timer.

For example, if the terminal device detects the wakeup signal in the first time period, and the drx-InactivityTimer running in the first time period has not stopped, the terminal device starts the drx-onDurationTimer in the DRX cycle after the first time period, and continues running the drx-InactivityTimer.

For another example, if the terminal device detects the wakeup signal in the first time period, and other DRX timers running in the first time period have not stopped, the terminal device starts the drx-onDurationTimer in the DRX cycle after the first time period, and continues keeping these running DRX timers, such as including at least one of: a drx-RetransmissionTimerDL, a drx-RetransmissionTimerUL, a drx-ShortCycleTimer, a DRX HARQ-RTT-TimerDL, a DRX HARQ-RTT-TimerUL, a ra-ContentionResolutionTimer and the like.

This is because the network device sending the wakeup signal to the terminal device indicates that the network device has data to be transmitted, at this time, the terminal device not only needs to start the drx-onDurationTimer at the appointed moment, but also needs to keep other DRX timers currently running.

Situation II

If the terminal device does not detect the wakeup signal and DRX timers running in the first time period have not stopped, the terminal device can stop some or all of these DRX timers, or continues keeping these DRX timers.

For example, if the terminal device does not detect the wakeup signal, and the drx-InactivityTimer running in the first time period has not stopped, the terminal device does not start the drx-onDurationTimer, and stops this drx-InactivityTimer.

For another example, if the terminal device does not detect the wakeup signal, and the drx-InactivityTimer running in the first time period has not stopped, the terminal device does not start the drx-onDurationTimer and continues running the drx-InactivityTimer.

For another example, if the terminal device does not detect the wakeup signal in the first time period, and other DRX timers running in the first time period have not stopped, the terminal device does not start the drx-onDurationTimer and keeps these running DRX timers, for example, including at least one of a drx-RetransmissionTimerDL, a drx-RetransmissionTimerUL, a drx-ShortCycleTimer, a DRX HARQ-RTT-TimerDL, a DRX HARQ-RTT-TimerUL, a ra-ContentionResolutionTimer and the like.

First, for the drx-InactivityTimer, the terminal device can stop or continue keeping the running DXR inactivity timer when the wakeup signal is not detected.

On the one hand, it is considered that that a triggering way of the drx-InactivityTimer is starting or restarting based on a new transmission schedule. Sometimes the network device only has one scheduling, and no more data will be scheduled for the terminal device later at the time when the drx-InactivityTimer is restarted. In addition, if the terminal device knows that the drx-onDurationTimer does not need to be started during the operation period of the drx-InactivityTimer, it indicates that the network device has no data to be provided to the terminal device at this time, and then it is not necessary to keep the drx-InactivityTimer. Therefore, if the terminal device does not detect the wakeup signal and the running drx-InactivityTimer has not stopped, the terminal device can choose to stop the drx-InactivityTimer.

On the other hand, there may be two situations when the terminal device does not detect the wakeup signal. One is that the network device has not sent the wakeup signal, and the other is that the network device has sent the wakeup signal but the terminal device has missed detection. The terminal device cannot distinguish between these two situations. If there is a drx-InactivityTimer still running in the first time period, it indicates that the terminal device is still in an active time. Therefore, if the terminal device does not detect the wakeup signal, and the running drx-InactivityTimer has not stopped, the terminal device can choose to continue keeping the running drx-InactivityTimer, so that there is still an opportunity to receive a PDCCH when a detection of the wakeup signal is missed.

Second, for other DRX timers such as a drx-RetransmissionTimerDL, a drx-RetransmissionTimerUL, a DRX HARQ-RTT-TimerDL, a DRX HARQ-RTT-TimerUL and the like, since starting these timers indicates that there is a retransmission scheduling at this time, these timers need to be kept continuing running. In addition, continuing keeping the other DRX timers can make the terminal device have an opportunity to receive the PDCCH when a detection of the wakeup signal is missed.

In an implementation, the method further includes: if the terminal device is in an active time after sending a scheduling request (SR) in the first time period, the terminal device continues keeping the active time.

For example, when the terminal device does not detect the wakeup signal, if the terminal device finishes sending a SR and the SR is in a pending state, which causes the terminal device to need to be in activate time, the terminal device continues keeping the activate time.

In an implementation, the method further includes: starting a first timer if the terminal device does not detect the wakeup signal in the first time period; starting the DRX On Duration timer in the DRX cycle after the first timer has been expired if the terminal device does not detect the wakeup signal in a timing duration of the first timer; and/or, stopping the first timer if the terminal device detects the wakeup signal in the timing duration of the first timer.

When the terminal device does not detect the wakeup signal, one situation is that the network device has not sent the wakeup signal, and the other situation is that the network device has sent the wakeup signal but the terminal device has missed detection. If it is the latter situation, it may be due to a poor quality of a current signal of the terminal device, such as the terminal device being at the edge of a cell, etc., thereby causing the terminal device unable to start the drx-onDurationTimer all the time since it fails to detect the wakeup signal, which will affect data scheduling performance.

Therefore, when the terminal device does not detect the wakeup signal in the first time period, the drx-onDurationTimer is not started in a next DRX cycle, and the first timer is started. If the terminal device does not detect the wakeup signal in a timing duration of the first timer, then when the timer has been expired, even if the terminal device does not detect the wakeup signal, the terminal device still needs to start the drx-onDurationTimer. If the terminal device detects the wakeup signal during the timing of the timer, the first timer is stopped.

In this way, a situation that the terminal device cannot start the drx-onDurationTimer for a long time due to failing to detect the wakeup signal can be avoided.

Configuration information of the first timer, such as timing duration and the like, can be notified to the terminal device by the network device, or agreed by a protocol.

The embodiment of the present application does not limit the timing duration of the first timer. For example, the timing duration of the first timer may be greater than a length of one or more DRX cycles.

Figure 6:
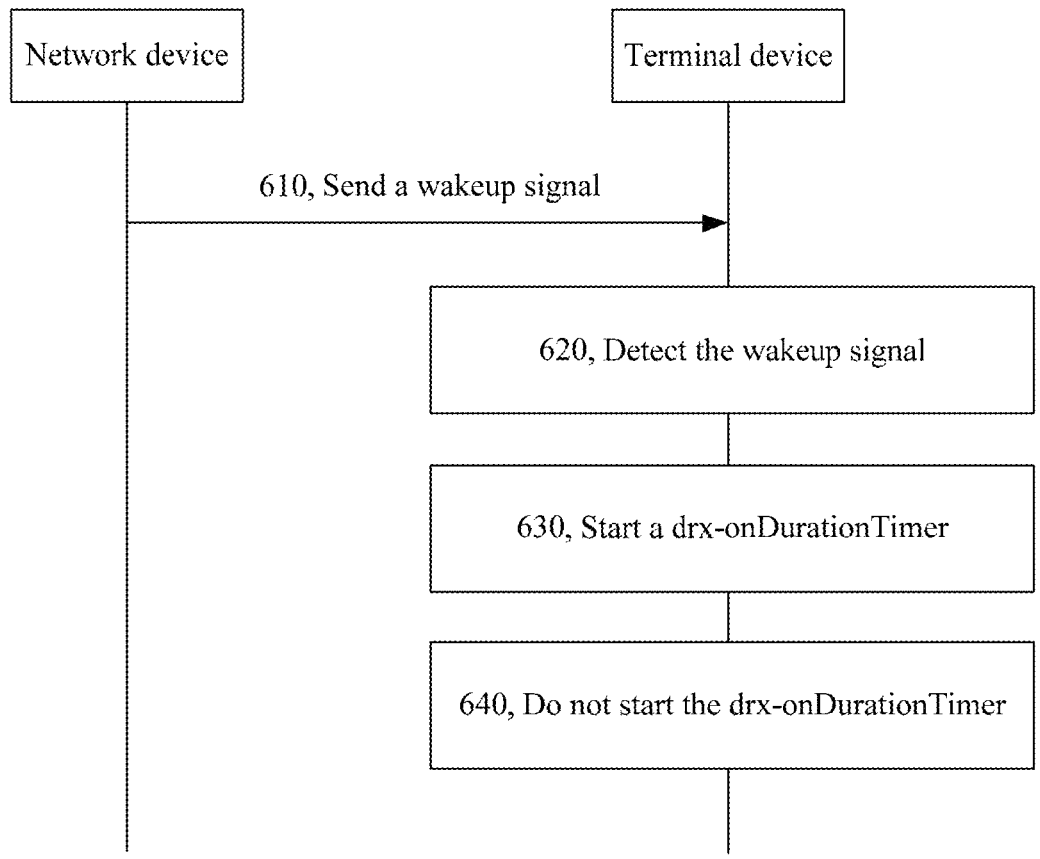
FIG. 6 is a schematic flowchart interaction diagram of a method for discontinuous reception according to an embodiment of the present application.

FIG. 6 is a schematic flow interaction diagram of a method for discontinuous reception according to an embodiment of the present application. The method shown in FIG. 6 can be executed by a terminal device and a network device, where the terminal device may be, for example, the terminal device 120 shown in FIG. 1, and the network device may be, for example, the network device 110 shown in FIG. 1. As shown in FIG. 6, the method for discontinuous reception includes:

In 610, the network device sends a wakeup signal WUS to the terminal device in a first time period.

The wakeup signal is used to instruct the terminal device whether to start a drx-onDurationTimer in a DRX cycle after the first time period.

In 620, the terminal device detects the wakeup signal in the first time period.

If the terminal device detects the wakeup signal and the wakeup signal is used to instruct the terminal device to start the drx-onDurationTimer in the DRX cycle after the first time period, the terminal device executes 630; and/or if the terminal device detects the wakeup signal and the wakeup signal is used to instruct the terminal device not to start the drx-onDurationTimer in the DRX cycle after the first time period, the terminal device executes 640; and/or if the terminal device does not detect the wakeup signal, 630 is executed.

In 630, the terminal device starts the drx-onDurationTimer in the DRX cycle after the first time period.

In 640, the terminal device does not start the drx-onDurationTimer in the DRX cycle after the first time period.

In this embodiment, the network device indicates whether the terminal device needs to start the drx-onDurationTimer at an appointed moment through sending the wakeup signal, and the terminal device determines whether it's necessary to start the drx-onDurationTimer in the DRX cycle after the wakeup signal according to the detected wakeup signal, so that it's not necessary to wake up and monitor a PDCCH in the case that there is no need to be waked up, thus further reducing the power consumption of the terminal device during a DRX process.

In the aforementioned method shown in FIG. 4, the network device indicates whether the terminal device needs to start the drx-onDurationTimer through whether sending the wakeup signal, while in the method shown in FIG. 6, the network device would send the wakeup signal to the terminal device and indicate whether the terminal device starts the drx-onDurationTimer by means of the content of the wakeup signal.

The drx-onDurationTimer is used to control On Duration in a DRX cycle. The start moment of the drx-onDurationTimer is the start moment of T1 in FIG. 2 and FIG. 3, and the end moment of the drx-onDurationTimer is the end moment of T1 in FIG. 2 and FIG. 3.

For example, as shown in FIG. 5, the first time period may be located before the time period T1, and is used to transmit the wakeup signal. The wakeup signal can be used to indicate whether the terminal device needs to wake up in the time period T1, or in other words, is used to indicate whether the drx-onDurationTimer needs to be started at the start location of the time period T1.

If the terminal device detects the wakeup signal in the first time period and the wakeup signal indicates that the terminal device starts the drx-onDurationTimer, or the terminal device does not detect the wakeup signal in the first time period, the terminal device starts the drx-onDurationTimer at the start moment of the time period T1, and wakes up and monitors the PDCCH in a timing duration of the drx-onDurationTimer, i.e. the time period T1; if the terminal device detects the wakeup signal in the first time period and the wakeup signal indicates that the terminal device does not start the drx-onDurationTimer, the terminal device does not have to start the drx-onDurationTimer, and stays in an sleeping state during the time period T1.

The network device can send indication information to the terminal device, where the indication information is used to indicate the first time period, for example, is used to indicate information such as a position and/or a length and the like of the first time period relative to the time period T1, so that the terminal device receives the indication information, so as to acquire the first time period and detects the wakeup signal in the first time period. The indication information may be, for example, a RRC signaling, a MAC signaling, or DCI, etc.

Alternatively, the first time period can also be agreed by a protocol.

If the network device has data to be sent that needs to be sent to the terminal device, a wakeup signal is sent to the terminal device, and the wakeup signal indicates that the terminal device starts the drx-onDurationTimer in the next DRX cycle, so that the terminal device wakes up and receives the data; if the network device has no data to be sent, a wakeup signal is sent to the terminal device, and the wakeup signal indicates that the terminal device does not start the drx-onDurationTimer in the next DRX cycle, thus the terminal device can continue staying in an sleeping state, which saves the power consumption of the terminal device.

For example, first information can be included in the wakeup signal, and the first information can occupy one bit. When a value of the bit is 1, it indicates that the terminal device starts the drx-onDurationTimer as usual in the DRX cycle after the first time period; when the value of this bit is 0, it indicates that the terminal device does not start the drx-onDurationTimer.

The wakeup signal in the first time period can be used to indicate whether the terminal device starts the drx-onDurationTimer in the DRX cycle after the first time period, or can also be used to indicate whether the terminal device starts the drx-onDurationTimer in multiple consecutive DRX cycles after the first time period, to which the embodiment of the present application does not limit.

The network device will send a wakeup signal to the terminal device in the first time period. Therefore, if the terminal device does not receive the wakeup signal, it indicates that the terminal device has missed detection of the wakeup signal. However, even if the terminal device knows that the detection of the wakeup signal has been missed, whether the network device wants to wake it up cannot be determined. The terminal device still starts the drx-onDurationTimer at the appointed moment when the wakeup signal is not detected, in order to ensure the scheduling performance and avoid missing data sent by the network device, although this may lose some power consumption.

Of course, in the embodiment of the present application, the terminal device can also be configured not to start the drx-onDurationTimer when the wakeup signal is not detected, thereby reducing the power consumption of the terminal device.

Since there may be other DRX timers except the drx-InactivityTimer running in the first time period, the terminal device needs to determine whether to stop these running DRX timers.

In an implementation, the method further includes: continuing running a drx-InactivityTimer running in the first time period if the terminal device detects the wakeup signal, the wakeup signal indicates that the terminal device starts the DRX On Duration timer in the DRX cycle after the first time period, and the drx-InactivityTimer has not stopped; and/or, continuing running or stopping the drx-InactivityTimer running in the first time period if the terminal device detects the wakeup signal, the wakeup signal indicates that the terminal device does not start the DRX On Duration timer in the DRX cycle after the first time period, and the drx-InactivityTimer has not been stopped; and/or, continuing running the drx-InactivityTimer running in the first time period if the terminal device does not detect the wakeup signal and the drx-InactivityTimer has not stopped.

In an implementation, the method further includes: continuing running, by the terminal device, other DRX timers running in the first time period if the other DRX timers have not stopped.

The other DRX timers mentioned here include, for example, at least one of the following DRX timers: a drx-RetransmissionTimerDL, a drx-RetransmissionTimerUL, a drx-ShortCycleTimer, a DRX HARQ-RTT-TimerDL, a DRX HARQ-RTT-TimerUL, a ra-ContentionResolutionTimer and the like.

This embodiment is further explained in combination with the following three situations.

Situation I

If the terminal device detects the wakeup signal in the first time period and the wakeup signal indicates that the terminal device starts the drx-onDurationTimer, and DRX timers running in the first time period have not stopped, the terminal device needs to continue running these DRX timers.

For example, if the terminal device detects the wakeup signal and the wakeup signal indicates that the terminal device starts the drx-onDurationTimer, and the drx-InactivityTimer running in the first time period has not stopped, the terminal device starts the drx-onDurationTimer in the DRX cycle after the first time period, and continues running the drx-InactivityTimer.

For another example, if the terminal device detects the wakeup signal and the wakeup signal indicates that the terminal device starts the drx-onDurationTimer, and other DRX timers running in the first time period have not stopped, the terminal device starts the drx-onDurationTimer in the DRX cycle after the first time period, and keeps these running DRX timers, for example, including at least one of a drx-RetransmissionTimerDL, a drx-RetransmissionTimerUL, a drx-ShortCycleTimer, a DRX HARQ-RTT-TimerDL, a DRX HARQ-RTT-TimerUL, a ra-ContentionResolutionTimer and the like.

This is because the network device sending the wakeup signal to the terminal device and instructing the terminal device to start the drx-onDurationTimer, indicates that the network device has data to be transmitted. Then at this time, the terminal device not only needs to start the drx-onDurationTimer at the appointed moment, but also needs to keep other DRX timers currently running.

Situation II

If the terminal device detects the wakeup signal and the wakeup signal indicates that the terminal device does not start the drx-onDurationTimer in the DRX cycle after the first time period, and DRX timers running in the first time period have not stopped, the terminal device can stop some or all of these DRX timers, or can continue keeping these DRX timers.

For example, if the terminal device detects the wakeup signal and the wakeup signal indicates that the terminal device does not starts the drx-onDurationTimer in the DRX cycle after the first time period, the terminal device does not start the drx-onDurationTimer and stops the running drx-InactivityTimer.

For another example, if the terminal device detects the wakeup signal and the wakeup signal indicates that the terminal device does not start the drx-onDurationTimer in the DRX cycle after the first time period, the terminal device does not start the drx-onDurationTimer, and keeps the drx-InactivityTimer that is running.

For another example, if the terminal device detects the wakeup signal and the wakeup signal indicates that the terminal device does not start the drx-onDurationTimer in the DRX cycle after the first time period, the terminal device does not start the drx-onDurationTimer, and keeps the running DRX timers, for example, including at least one of a drx-RetransmissionTimerDL, a drx-RetransmissionTimerUL, a drx-ShortCycleTimer, a DRX HARQ-RTT-TimerDL, a DRX HARQ-RTT-TimerUL, a ra-ContentionResolutionTimer and the like.

For the same reason as the foregoing, a triggering way of the drx-InactivityTimer is starting or restarting based on a new transmission scheduling. Sometimes the network device only has one scheduling, and no more data will be scheduled for the terminal device later at the time when the drx-InactivityTimer is restarted. If the wakeup signal received by the terminal device indicates that the drx-InactivityTimer is not to be started, which indicates that the network device has no data to give to the terminal device at this time, it is not necessary to keep the drx-InactivityTimer. Therefore, when the terminal device detects the wakeup signal and the wakeup signal indicates that the drx-InactivityTimer is not to be started, the terminal device can choose to stop the drx-InactivityTimer in addition to keeping the running drx-InactivityTimer.

In an implementation, second information can also be included in the wakeup signal, and the second information is used to indicate whether to continue running or stop the drx-InactivityTimer running in the first time period.

After the terminal device receives the wakeup signal, if the second information in the wakeup signal indicates that the running drx-InactivityTimer is to be stopped, the terminal device stops the drx-InactivityTimer; if the second information in the wakeup signal indicates that the running of the drx-InactivityTimer is to be continued, the terminal device keeps the running of the drx-InactivityTimer.

In addition, the wakeup signal can also be used to indicate whether other DRX timers, such as a drx-RetransmissionTimerDL, a drx-RetransmissionTimerUL, a DRX HARQ-RTT-TimerDL, a DRX HARQ-RTT-TimerUL and the like need to be stopped.

Situation III

If the terminal device does not detect the wakeup signal and the DRX timers running in the first time period have not stopped, the terminal device needs to continue running these DRX timers.

For example, if the terminal device does not detect the wakeup signal in the first time period, and the drx-InactivityTimer running in the first time period has not stopped, the terminal device starts the drx-onDurationTimer in the DRX cycle after the first time period, and continues running the drx-InactivityTimer.

For another example, if the terminal device does not detect the wakeup signal in the first time period, and other DRX timers running in the first time period have not stopped, the terminal device starts the drx-onDurationTimer in the DRX cycle after the first time period, and continues and keeps these running DRX timers, for example, including at least one of a drx-RetransmissionTimerDL, a drx-RetransmissionTimerUL, a drx-ShortCycleTimer, a DRX HARQ-RTT-TimerDL, a DRX HARQ-RTT-TimerUL, a ra-ContentionResolutionTimer and the like.

In an implementation, the method further includes: if the terminal device is in an active time after sending a SR in the first time period, the terminal device continues keeping the active time.

For example, when the terminal device does not detect the wakeup signal, if the terminal device finishes sending a SR and the SR is in a pending state, which causes the terminal device to need to be in activate time, the terminal device continues keeping the activate time.

It should be noted that, under the premise of no conflict, the various embodiments described in the present application and/or the technical features in each embodiment can be combined with each other arbitrarily, and the technical solutions obtained after the combination should also fall within the protection scope of the present application.

In various embodiments of the present application, sizes of the sequence numbers of the above-mentioned processes do not mean the execution orders, and the execution orders of the process should be determined by their functions and internal logic, and should not constitute any restriction to the implementation processes of the embodiments of the present application.

A method for message transmission according to the embodiment of the present application is described in detail above. Apparatuses according to the embodiments of the present application will be described below in conjunction with FIG. 7 to FIG. 14. The technical features described in the method embodiments are applicable to the following apparatus embodiments.

Figure 7:
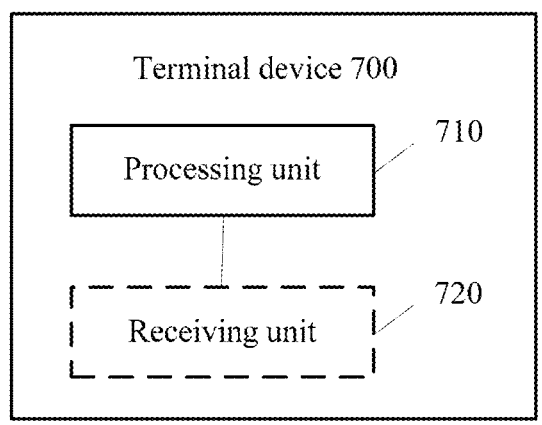
FIG. 7 is a schematic block diagram of a terminal device according to an embodiment of the present application.

FIG. 7 is a schematic block diagram of a terminal device 700 according to an embodiment of the present application. As shown in FIG. 7, the terminal device 700 includes a processing unit 710, configured to:
- detect a wakeup signal in a first time period;
- start a drx-onDurationTimer in a DRX cycle after the first time period if the wakeup signal is detected; and/or
- not start the drx-onDurationTimer in the DRX cycle after the first time period if the wakeup signal is not detected.

Therefore, the terminal device determines, according to whether the wakeup signal sent by the network device is detected, whether the drx-onDurationTimer needs to be started in the DRX cycle after the wakeup signal, so that it's not necessary to wake up and monitor a PDCCH in the case that there is no need to be waked up, thus further reducing the power consumption of the terminal device in a DRX process.

In an implementation, the processing unit 710 is further configured to:
- continue running or stop a drx-InactivityTimer running in the first time period if the wakeup signal is not detected and the drx-InactivityTimer has not stopped; and/or
- continue running the drx-InactivityTimer running in the first time period if the wakeup signal is detected and the drx-InactivityTimer has not stopped.

In an implementation, the processing unit 710 is further configured to: continue running other DRX timers running in the first time period if the other DRX timers has not stopped.

The other DRX timers include at least one of the following: a drx-RetransmissionTimerDL, a drx-RetransmissionTimerUL, a drx-ShortCycleTimer, a DRX HARQ-RTT-TimerDL, a DRX HARQ-RTT-TimerUL, and a ra-ContentionResolutionTimer.

In an implementation, the processing unit 710 is further configured to: control the terminal device to continue keeping an activate time after sending a SR if the terminal device is in the activate time in the first time period.

In an implementation, the terminal device further includes a receiving unit 720, configured to: receive indication information sent by a network device, where the indication information is used to indicate the first time period.

In an implementation, the processing unit 710 is further configured to:
- start a first timer if the wakeup signal is not detected in the first time period;
- start the drx-onDurationTimer in the DRX cycle after the first timer has been expired if no wakeup signal is detected in a timing duration of the first timer; and/or,
- stop the first timer if the wakeup signal is detected in the timing duration of the first timer.

It should be understood that the terminal device 700 can perform corresponding operations performed by the terminal device in the method 400 according to the embodiment of the present application, which are not repeated here again for the sake of brevity.

Figure 8:
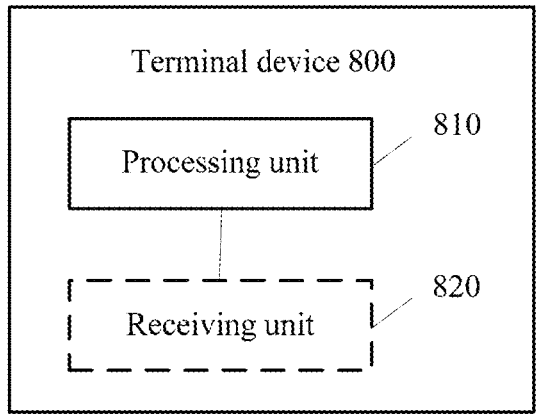
FIG. 8 is a schematic block diagram of a terminal device according to an embodiment of the present application.

FIG. 8 is a schematic block diagram of a terminal device 800 according to an embodiment of the present application. As shown in FIG. 8, the terminal device 800 includes a processing unit 810, configured to:
- detect a wakeup signal in a first time period;
- start a drx-onDurationTimer in a DRX cycle after the first time period if the wakeup signal is detected and the wakeup signal is used to indicate that the terminal device starts the drx-onDurationTimer in the DRX cycle after the first time period, or the terminal device does not detect the wakeup signal; and/or
- not start the drx-onDurationTimer in the DRX cycle after the first time period if the wakeup signal is detected and the wakeup signal is used to indicate that the terminal device does not start the drx-onDurationTimer in the DRX cycle after the first time period.

Therefore, the terminal device determines, according to the detected wakeup signal, whether the drx-onDurationTimer needs to be started in the DRX cycle after the wakeup signal, so that it's not necessary to wake up and monitor a PDCCH in the case that there is no need to be waked up, thus further reducing the power consumption of terminal device in a DRX process.

In an implementation, the processing unit 810 is further configured to:
- continue running a drx-InactivityTimer running in the first time period if the wakeup signal is detected, the wakeup signal indicates that the terminal device starts the drx-onDurationTimer in the DRX cycle after the first time period, and the drx-InactivityTimer has not stopped; and/or
- continue running the drx-InactivityTimer running in the first time period if no wakeup signal is detected and the drx-InactivityTimer has not stopped; and/or
- continue running or stop the drx-InactivityTimer running in the first time period if the wakeup signal is detected, the wakeup signal indicates that the terminal device does not start the drx-onDurationTimer in the DRX cycle after the first time period, and the drx-InactivityTimer has not stopped.

In an implementation, first information and second information are included in the wakeup signal, where the first information is used to indicate whether the terminal device starts the drx-onDurationTimer in the DRX cycle after the first time period, and the second information is used to indicate whether to continue running or stop the drx-InactivityTimer running in the first time period.

In an implementation, the processing unit 810 is further configured to: continue running other DRX timers running in the first time period if the other DRX timers have not stopped.

The other DRX timers include at least one of the following: a drx-RetransmissionTimerDL, a drx-RetransmissionTimerUL, a drx-ShortCycleTimer, a DRX HARQ-RTT-TimerDL, a DRX HARQ-RTT-TimerUL, and a ra-ContentionResolutionTimer.

In an implementation, the processing unit 810 is further configured to: control the terminal device to continue keeping an active time after sending a SR if the terminal device is in the active time in the first time period.

In an implementation, the terminal device further includes a receiving unit 820, configured to: receive indication information sent by a network device, where the indication information is used to indicate the first time period.

It should be understood that the terminal device 800 can perform corresponding operations performed by the terminal device in the method 600 according to the embodiment of the present application, which are not repeated here again for the sake of brevity.

Figure 9:
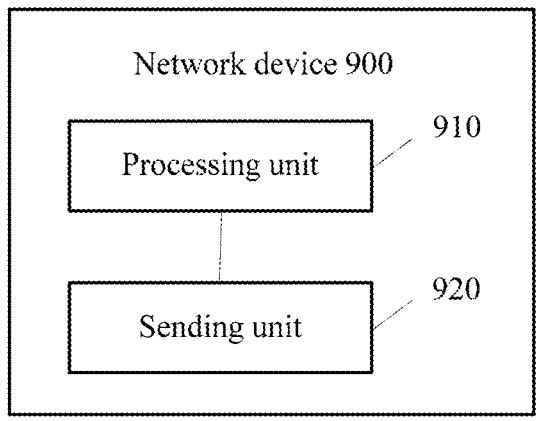
FIG. 9 is a schematic block diagram of a network device according to an embodiment of the present application.

FIG. 9 is a schematic block diagram of a network device 900 according to an embodiment of the present application. As shown in FIG. 9, the network device 900 includes a processing unit 910 and a sending unit 920, where, the processing unit 910 is configured to: determine whether a terminal device needs to start a discontinuous reception drx-onDurationTimer in a DRX cycle after a first time period; and the sending unit 920 is configured to:
send a wakeup signal to the terminal device in the first time period if the processing unit determines that the terminal device needs to start the drx-onDurationTimer; and/or
not send the wakeup signal to the terminal device in the first time period if the processing unit determines that the terminal device does not need to start the drx-onDurationTimer.

Therefore, the network device indicates the terminal device whether the terminal device needs to start the drx-onDurationTimer at an appointed moment through whether sending the wakeup signal, and the terminal device determines whether it is necessary to start the drx-onDurationTimer in the DRX cycle after the wakeup signal according to whether the wakeup signal sent by the network device is detected, so that it's not necessary to wake up and monitor a PDCCH in the case that there is no need to be waked up, thus further reducing the power consumption of the terminal device during the DRX process.

In an implementation, the sending unit 920 is further configured to: send indication information to the terminal device, where the indication information is used to indicate the first time period.

It should be understood that the network device 900 can perform corresponding operations performed by the network device in the method 400 according to the embodiment of the present application, which are not repeated here again for the sake of brevity.

Figure 10:
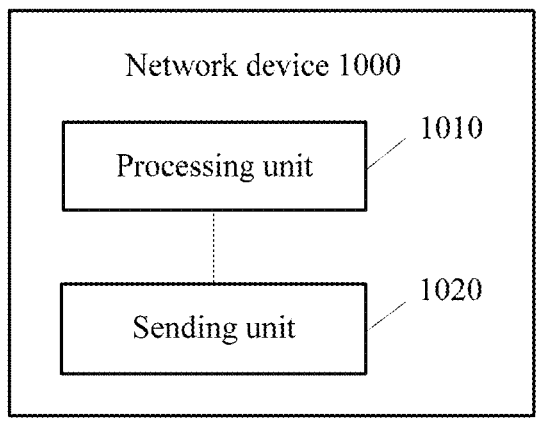
FIG. 10 is a schematic block diagram of a network device according to an embodiment of the present application.

FIG. 10 is a schematic block diagram of a network device 1000 according to an embodiment of the present application. As shown in FIG. 10, the network device 1000 includes a processing unit 1010 and a sending unit 1020, where,
the processing unit 1010 is configured to: generate a wakeup signal, where the wakeup signal is used to indicate whether a terminal device starts a drx-onDurationTimer in a DRX cycle after a first time period; and
the sending unit 1020 is configured to: send the wakeup signal to the terminal device in the first time period.

Therefore, the network device indicates whether the terminal device needs to start the drx-onDurationTimer at an appointed moment through sending the wakeup signal, and the terminal device determines whether it is necessary to start the drx-onDurationTimer in the DRX cycle after the wakeup signal according to the detected wakeup signal, so that it's not necessary to wake up and monitor a PDCCH in the case that there is no need to be waked up, thus further reducing the power consumption of the terminal device during a DRX process.

In an implementation, the sending unit 1020 is further configured to: send indication information to the terminal device, where the indication information is used to indicate the first time period.

In an implementation, first information and second information are included in the wakeup signal, where the first information is used to indicate whether the terminal device starts the drx-onDurationTimer in the DRX cycle after the first time period, and the second information is used to indicate whether to continue running or stop the DRX inactivation timer that is running in the first time period.

It should be understood that the network device 1000 can perform corresponding operations performed by the network device in the method 600 according to the embodiment of the present application, which are not repeated here again for the sake of brevity.

Figure 11:
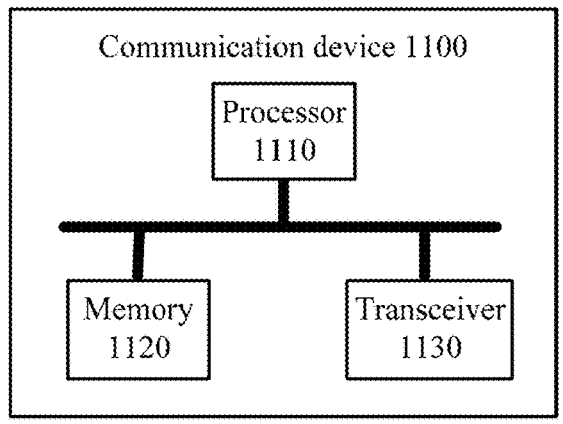
FIG. 11 is a schematic structure diagram of a communication device according to an embodiment of the present application.

FIG. 11 is a schematic structural diagram of a communication device 1100 provided by an embodiment of the present application. The communication device 1100 shown in FIG. 11 includes a processor 1110, where the processor 1110 can call a computer program from a memory and run the computer program to implement the methods according to the embodiments of the present application.

In an implementation, as shown in FIG. 11, the communication device 1100 can further include a memory 1120. The processor 1110 can call a computer program from the memory 1120 and run the computer program to implement the methods according to the embodiments of the present application.

The memory 1120 may be a separate device independent of the processor 1110, or may be integrated in the processor 1110.

In an implementation, as shown in FIG. 11, the communication device 1100 can further include a transceiver 1130, where the processor 1110 can control the transceiver 1130 to communicate with other devices, which specifically, to send information or data to the other devices, or to receive information or data sent by the other devices.

The transceiver 1130 can include a transmitter and a receiver. The transceiver 1130 can further include an antenna, and the number of the antennas may be one or more.

In an implementation, the communication device 1100 may specifically be a terminal device of an embodiment of the present application, and the communication device 1100 can implement corresponding processes implemented by the terminal device in each method of the embodiments of the present application, which are not repeated here again for the sake of brevity.

In an implementation, the communication device 1100 may specifically be a network device of an embodiment of the present application, and the communication device 1100 can implement corresponding processes implemented by the network device in each method of the embodiments of the present application, which are not repeated here again for the sake of brevity.

Figure 12:
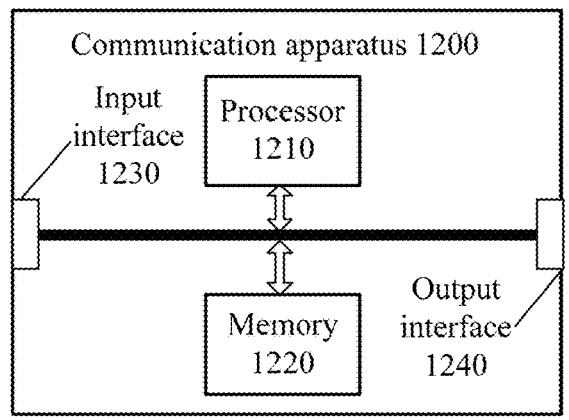
FIG. 12 is a schematic structure diagram of a communication apparatus according to an embodiment of the present application.

FIG. 12 is a schematic structural diagram of a communication apparatus according to an embodiment of the present application. The communication apparatus 1200 shown in FIG. 12 includes a processor 1210, where the processor 1210 can call a computer program from a memory and run the computer program to implement the methods according to the embodiments of the present application.

In an implementation, as shown in FIG. 12, the communication apparatus 1200 may further include a memory 1220. The processor 1210 can call a computer program from the memory 1220 and run the computer program to implement the methods according to the embodiments of the present application.

The memory 1220 may be a separate device independent of the processor 1210, or may be integrated in the processor 1210.

In an implementation, the communication apparatus 1200 can further include an input interface 1230, where the processor 1210 can control the input interface 1230 to communicate with other devices or chips, which specifically, to obtain information or data sent by the other devices or chips.

In an implementation, the communication apparatus 1200 can further include an output interface 1240, where the processor 1210 can control the output interface 1240 to communicate with other devices or chips, which specifically, to output information or data to the other devices or chips.

In an implementation, the communication apparatus 1200 can be applied to the network devices according to the embodiments of the present application, and the communication apparatus can implement corresponding processes implemented by the network devices in the various methods according to the embodiments of the present application, which are not repeated here again for the sake of brevity.

In an implementation, the communication apparatus 1200 can be applied to the terminal devices according to the embodiments of the present application, and the communication apparatus can implement corresponding processes implemented by the terminal devices according to the various methods of the embodiments of the present application, which are not repeated here again for the sake of brevity.

In an implementation, the communication apparatus 1200 may be a chip.

The chip may also be referred to as a system-level chip, a system chip, a chip system or a system on chip, etc.

The processors in the embodiments of the present application may be an integrated circuit chip with capability of signal processing. In the implementation process, the various steps of the above-described method embodiments can be completed by hardware of integrated logic circuits in the processor or instructions in the form of software. The above-described processors can be a general-purpose processor, a digital signal processor (DSP), an application specific integrated circuit (ASIC), a field programmable gate array (FPGA) or other programmable logic devices, discrete gates or transistor logic devices, discrete hardware components. The methods, steps, and logical block diagrams disclosed in the embodiments of the present application can be implemented or executed. The general-purpose processor can be a microprocessor, or the processor can also be any conventional processor, etc. The steps of the methods disclosed in combination with the embodiments of the present application may be directly embodied as being executed and completed by a hardware decoding processor, or by a combination of hardware and software modules in a decoding processor. The software modules may be located in a mature storage medium in the field, such as a random access memory, a flash memory, a read-only memory, a programmable read-only memory or an erasable programmable memory, a register, etc. The storage medium is located in the memory, and the processor reads information in the memory and completes the steps of the above-described methods in combination with its hardware.

The memory in the embodiments of the present application can be a volatile memory or a non-volatile memory, or can includes both of the volatile memory and a non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM) that is used as an external cache. By way of exemplary but not restrictive description, many forms of RAMs are available, such as a static RAM (SRAM), a dynamic RAM (DRAM), a Synchronous DRAM (SDRAM), a double data rate SDRAM (DDR SDRAM), an enhanced SDRAM (ESDRAM), a synch link DRAM (SL-DRAM) and a direct rambus RAM (DR RAM).

Figure 13:
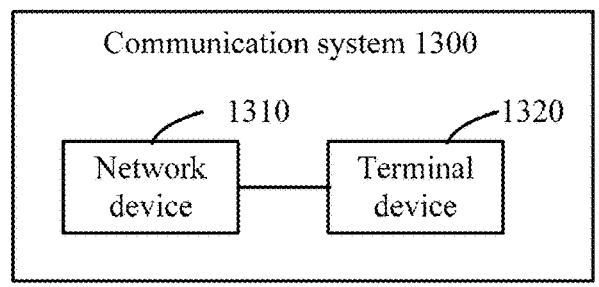
FIG. 13 is a schematic block diagram of a communication system according to an embodiment of the present application.

FIG. 13 is a schematic block diagram of a communication system 1300 according to an embodiment of the present application. As shown in FIG. 13, the communication system 1300 includes a network device 1310 and a terminal device 1320.

The network device 1310 is configured to: determine whether the terminal device needs to start a drx-onDurationTimer in a DRX cycle after a first time period; send a wakeup signal to the terminal device in the first time period if it is determined that the terminal device needs to start the drx-onDurationTimer; and/or not send the wakeup signal to the terminal device in the first time period if it is determined that the terminal device does not need to start the drx-onDurationTimer.

The terminal device 1320 is configured to: detect the wakeup signal in the first time period; start the drx-onDurationTimer in the DRX cycle after the first time period if the wakeup signal is detected; and/or, not start the drx-onDurationTimer in the DRX cycle after the first time period if the terminal device does not detect the wakeup signal.

The network device 1310 can be applied to implement corresponding functions implemented by the network devices in the methods according to the embodiments of the present application, and the composition of the network device 1310 can be as shown in the network device 900 in FIG. 9, which for the sake of brevity, are not be repeated here again.

The terminal device 1320 can be applied to implement corresponding functions implemented by the terminal devices in the methods according to the embodiments of the present application, and the composition of the terminal device 1320 can be as shown in the terminal device 700 in FIG. 7, which for the sake of brevity, are not be repeated here again.

Figure 14:
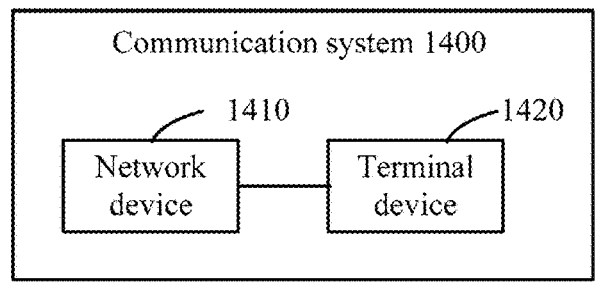
FIG. 14 is a schematic block diagram of a communication system according to another embodiment of the present application.

FIG. 14 is a schematic block diagram of a communication system 1400 according to an embodiment of the present application. As shown in FIG. 14, the communication system 1400 includes a network device 1410 and a terminal device 1420.

The network device 1410 is configured to: send a wakeup signal to the terminal device in a first time period, where the wakeup signal is used to indicate whether the terminal device starts a drx-onDurationTimer in a DRX cycle after the first time period.

The terminal device 1420 is configured to: detect the wakeup signal in the first time period; start the drx-onDurationTimer in the DRX cycle after the first time period if the wakeup signal is detected and the wakeup signal is used to indicate that the terminal device starts the drx-onDurationTimer in the DRX cycle after the first time period, or no wakeup signal is detected; and/or, not start the drx-onDurationTimer in the DRX cycle after the first time period if the wakeup signal is detected and the wakeup signal is used to indicate that the terminal device does not start the drx-onDurationTimer in the DRX cycle after the first time period.

The network device 1410 can be applied to implement corresponding functions implemented by the network devices in the methods according to the embodiments of the present application, and the composition of the network device 1410 can be as shown in the network device 1000 in FIG. 10, which are not be repeated here again for the sake of brevity.

The terminal device 1420 can be applied to implement corresponding functions implemented by the terminal devices in the methods according to the embodiments of the present application, and the composition of the terminal device 1420 can be as shown in the terminal device 800 in FIG. 8, which are not be repeated here again for the sake of brevity.

According to an embodiment of the present application, a computer-readable storage medium is provided, and is configured to store a computer program. In an implementation, the computer-readable storage medium can be applied to the network devices according to the embodiments of the present application, and the computer program causes a computer to execute corresponding processes implemented by the network devices in various methods according to the embodiments of the present application, which are not repeated again for the sake of brevity. In an implementation, the computer-readable storage medium can be applied to the terminal devices according to the embodiments of the present application, and the computer program causes a computer to execute corresponding processes implemented by the terminal devices in various methods according to the embodiments of the present application, which are not repeated again for the sake of brevity.

According to an embodiment of the present application, a computer program product is provided, including computer program instructions. In an implementation, the computer program product can be applied to the network devices according to the embodiments of the present application, and the computer program instructions cause a computer to execute corresponding processes implemented by the network devices in various methods according to the embodiments of the present application, which are not repeated here again for the sake of brevity. In an implementation, the computer program product can be applied to the terminal devices according to the embodiments of the present application, and the computer program instructions cause a computer to execute corresponding processes implemented by the terminal devices in various methods according to the embodiments of the present application, which are not repeated here again for the sake of brevity.

According to an embodiment of the present application, a computer program is provided. In an implementation, the computer program can be applied to the network devices according to the embodiments of the present application, and when executed in a computer, the computer program causes the computer to execute corresponding processes implemented by the network devices in various methods according to the embodiments of the present application, which are not repeated here again for the sake of brevity. In an implementation, the computer program can be applied to the terminal devices according to the embodiments of the present application, and when executed in a computer, the computer program causes a computer to execute corresponding processes implemented by the terminal devices in various methods according to the embodiments of the present application, which are not repeated here again for the sake of brevity.

Terms "system" and "network" in the embodiments of the present application are often interchangeably used herein. The term "and/or" herein only describes an association relationship describing associated objects, which means that there can be three relationships, for example, A and/or B can mean: three situations that A exists alone, A and B exist at the same time, and B exist alone. In addition, the character "/" herein generally means that the associated objects before and after are in an "or" relationship.

In the embodiments of the present application, "B corresponding (that corresponds) to A| means that B is associated with A, and B can be determined according to A. But it should also be understood that determining B according to A does not mean that B is determined only based on A, and B can also be determined based on A and/or other information.

Those skilled in the art may realize that the units and algorithm steps of each example described in combination with the embodiments disclosed herein can be implemented by electronic hardware or a combination of computer software and electronic hardware. Whether these functions are executed exactly by hardware or software depends on the specific application and design constraints of the technical solution. Professional technicians may use different methods to implement the described functions for each specific application, but this implementation should not be considered as beyond the scope of the present application.

Those skilled in the art may clearly understand that, for convenient and concise description, the corresponding processes in the foregoing method embodiments may be referred to for the specific working processes of the above-described systems, apparatuses and units, and are not described here again in detail.

In the several embodiments provided in the present application, it should be understood that the disclosed system, apparatus and method can be implemented in other ways. For example, the apparatus embodiments described above are merely schematic. For example, the division of units is only a logical functional division, and there may be other division manners in actual implementation. For example, multiple units or components may be combined or integrated to another system, or some features may be ignored or not executed. In addition, the shown or discussed mutual coupling or direct coupling or communication connection may be indirect coupling or communication connection through some interfaces, apparatuses or units, and may be in electrical, mechanical or other forms.

The units described as separate parts may or may not be physically separated, and the parts shown as units may or may not be a physical unit. That is, they may be located in one place, or may also be distributed on multiple network units. Some or all of the units may be selected according to actual needs to achieve the objective of the technical solution of the present embodiment.

In addition, the functional units in the various embodiments of the present application may be integrated into one processing unit, or each unit may exist alone physically, or two or more units may be integrated into one unit.

If implemented in the form of software function units and sold or used as a stand-alone product, the described functions may be stored in one computer-readable storage medium. Based on such understanding, the essence or the part contributing to the prior art or part of the technical solutions of the present application may be embodied in a form of software product, and the computer software product is stored in a storage medium, including several instructions for causing a computer device (which may be a personal computer, a server, or a network device, etc.) to execute all or part of the steps of the methods described in the embodiments of the present application. The foregoing storage medium includes a medium capable of storing program codes, such as: a U disk, a mobile hard disk, a read-only memory (ROM), a random access memory (RAM), a magnetic disk, or an optical disk, or the like.

That described above is only the specific implementations of the present application, but the protection scope of the embodiments of the present application is not limited thereto. Any change or replacement that can be easily conceived by those familiar with the art within the technical scope disclosed in the present application should be covered within the protection scope of the embodiments of the present application. Therefore, the protection scope of the present application should be subject to the protection scope of the claims.

What is claimed is:

1. A method for discontinuous reception (DRX), comprising:
    detecting, by a terminal device, a wakeup signal in a first time period;
    wherein a DRX On Duration timer meets at least one of:
    in a case that the terminal device detects the wakeup signal and the wakeup signal is used to indicate that the terminal device starts the DRX On Duration timer in a DRX cycle after the first time period, or the terminal device does not detect the wakeup signal, the DRX On Duration timer is started in the DRX cycle after the first time period; and
    in a case that the terminal device detects the wakeup signal and the wakeup signal is used to indicate that the terminal device does not start the DRX On Duration timer in the DRX cycle after the first time period, the DRX On Duration timer is not started in the DRX cycle after the first time period.

2. The method according to claim 1, further comprising at least one of:
    continuing running a DRX inactivity timer running in the first time period in a case that the terminal device detects the wakeup signal, the wakeup signal indicates that the terminal device starts the DRX On Duration timer in the DRX cycle after the first time period, and the DRX inactivity timer has not stopped;
    continuing running the DRX inactivity timer running in the first time period in a case that the terminal device does not detect the wakeup signal and the DRX inactivity timer has not stopped; and,
    continuing running or stopping the DRX inactivity timer running in the first time period in a case that the terminal device detects the wakeup signal, the wakeup signal indicates that the terminal device does not start the DRX On Duration timer in the DRX cycle after the first time period, and the DRX inactivity timer has not been stopped.

3. The method according to claim 2, wherein first information and second information are comprised in the wakeup signal, wherein the first information is used to indicate whether the terminal device starts the DRX On Duration timer in the DRX cycle after the first time period, and the second information is used to indicate whether to continue running or stop the DRX inactivity timer running in the first time period.

4. The method according to claim 1, further comprising:
    continuing running, by the terminal device, other DRX timers running in the first time period in a case that the other DRX timers have not stopped;
    wherein the other DRX timers comprise at least one of the following: a DRX downlink retransmission timer, a DRX uplink retransmission timer, a DRX short cycle timer, a DRX downlink hybrid automatic repeat request (HARQ) round-trip time timer, a DRX uplink HARQ round-trip time timer, and a random access contention resolution timer.

5. The method according to claim 1, further comprising:
    continuing keeping, by the terminal device, an activate time after sending a scheduling request (SR) in a case that the terminal device is in the activate time in the first time period.

6. The method according to claim 1, further comprising:
    receiving, by the terminal device, indication information sent by a network device, wherein the indication information is used to indicate the first time period.

7. A terminal device, comprising:
    a processor, configured to detect a wakeup signal in a first time period;
    wherein the processor is further configured to execute at least one of:
    starting a discontinuous reception (DRX) On Duration timer in a DRX cycle after the first time period in a case that the wakeup signal is detected and the wakeup signal is used to indicate that the terminal device starts the DRX On Duration timer in the DRX cycle after the first time period, or the terminal device does not detect the wakeup signal; and
    not starting the DRX On Duration timer in the DRX cycle after the first time period in a case that the wakeup signal is detected and the wakeup signal is used to indicate that the terminal device does not start the DRX On Duration timer in the DRX cycle after the first time period.

8. The terminal device according to claim 7, wherein the processor is further configured to execute at least one of:
    continuing running a DRX inactivity timer running in the first time period in a case that the wakeup signal is detected, the wakeup signal indicates that the terminal device starts the DRX On Duration timer in the DRX cycle after the first time period, and the DRX inactivity timer has not stopped;
    continuing running the DRX inactivity timer running in the first time period in a case that no wakeup signal is detected and the DRX inactivity timer has not stopped; and
    continuing running or stopping the DRX inactivity timer running in the first time period in a case that the wakeup signal is detected, the wakeup signal indicates that the terminal device does not start the DRX On Duration timer in the DRX cycle after the first time period, and the DRX inactivity timer has not stopped.

9. The terminal device according to claim 8, wherein first information and second information are comprised in the wakeup signal, wherein the first information is used to indicate whether the terminal device starts the DRX On Duration timer in the DRX cycle after the first time period, and the second information is used to indicate whether to continue running or stop the DRX inactivity timer running in the first time period.

* * * * *